United States Patent

Hoshino

[11] Patent Number: 5,347,111
[45] Date of Patent: Sep. 13, 1994

[54] AUTHENTICITY IDENTIFYING STRUCTURE FOR AN ARTICLE

[75] Inventor: Hidekazu Hoshino, Kanagawa, Japan

[73] Assignee: NHK Spring Co., Ltd., Kanagawa, Japan

[21] Appl. No.: 998,067

[22] Filed: Dec. 23, 1992

[30] Foreign Application Priority Data

Dec. 26, 1991 [JP] Japan .................. 3-357646

[51] Int. Cl.⁵ ............... G06K 19/00; B42D 15/00
[52] U.S. Cl. ............................ 235/457; 235/487; 359/2; 283/86; 283/90
[58] Field of Search .......... 235/457, 487; 356/71, 356/365; 359/576, 2; 283/87, 90, 86

[56] References Cited

U.S. PATENT DOCUMENTS

| | | | |
|---|---|---|---|
| 4,034,211 | 7/1977 | Horst et al. | 235/61.12 |
| 4,129,382 | 12/1978 | Greenaway | 356/71 |
| 4,163,570 | 8/1979 | Greenaway | 283/8 A |
| 4,183,665 | 1/1980 | Iannadrea et al. | 356/71 |
| 4,211,918 | 7/1980 | Nyfeler et al. | 235/464 |
| 4,472,627 | 9/1984 | Weinberger | 235/487 |
| 4,501,439 | 2/1985 | Antes | 283/91 |
| 4,514,085 | 4/1985 | Kaye | 356/71 |
| 4,537,504 | 8/1985 | Baltes et al. | 356/71 |
| 4,659,112 | 4/1987 | Reiner et al. | 283/90 |
| 4,794,585 | 12/1988 | Lee | 369/112 |
| 4,896,901 | 1/1990 | Ekelund | 283/90 |
| 4,906,829 | 3/1990 | Iseli | 235/457 |
| 5,004,327 | 4/1991 | Rosen | 350/398 |
| 5,010,243 | 4/1991 | Fukushima et al. | 235/488 |
| 5,034,616 | 7/1991 | Bercovitz | 250/556 |
| 5,044,707 | 9/1991 | Mallik | 358/2 |
| 5,101,184 | 3/1992 | Antes | 235/457 |
| 5,237,164 | 8/1993 | Takada | 235/487 |
| 5,267,753 | 12/1993 | Chock | 283/58 |

FOREIGN PATENT DOCUMENTS

| | | | |
|---|---|---|---|
| 61-176969 | 8/1986 | Japan | G03H 1/02 |
| 61-182580 | 11/1986 | Japan . | |
| 2-261694 | 3/1989 | Japan | B42D 5/15 |
| 2-212193 | 8/1990 | Japan | B42D 5/15 |
| 3-71383 | 3/1991 | Japan . | |
| 93-00224 | 1/1993 | PCT Int'l Appl. | B42D 5/15 |

*Primary Examiner*—Donald Hajec
*Assistant Examiner*—Jeffrey R. Filipek
*Attorney, Agent, or Firm*—Sjkerven, Morrill, MacPherson, Franklin & Friel

[57] ABSTRACT

For the purpose of identifying the authenticity of an article, an incident detecting light beam having a certain wave length and a polarization plane extending in a certain direction is projected from a light emitting element, and the plane of polarization of this incident light is rotated by 90° as it impinges upon and reflected by an identification region having a specific reflective directivity owing to its diffractive property, and the reflected linearly polarized light is received by a light receiving element which is capable of recognizing the diffractive property via a polarization filter oriented so as to receive only the light having a plane of polarization perpendicular to that of the incident light. According to this structure, it is practically impossible to detect that this region is being used as such an identification region or to understand the structure for identification without analyzing the light emitting and receiving unit because the rotation of the polarization plane is determined merely by selecting the thickness and the optical property of the normally used material. Further, since the optical identification unit is not normally available to a potential counterfeiter, an unauthorized duplication is extremely difficult.

6 Claims, 4 Drawing Sheets

AUTHENTICITY IDENTIFYING STRUCTURE FOR AN ARTICLE

TECHNICAL FIELD

The present invention relates to a structure for determining the authenticity of articles.

BACKGROUND OF THE INVENTION

As a conventionally known structure for determining the authenticity of information storage cards such as magnetic cards, securities, tickets and commercial goods, Japanese Utility Model Laid Open Publication (Kokai) No. 61-182580 discloses an identification structure comprising a hologram which is adhered to an article as an identification seal, which is difficult to duplicate for an unauthorized person, and can be visually identified.

Japanese Patent Laid Open Publication (Kokai) No. 3-71383 by the Applicant of this application also discloses an identification structure comprising a hologram as an identification seal having a specific light diffractive property provided on the surface of an article, and optical identification means for determining the authenticity of the article by projecting a light beam upon the hologram and receiving the diffracted light therefrom.

In particular, according to the structure mentioned above, the unauthorized duplication of the identification seal is extremely difficult, and the identification of the authenticity of the article may be satisfactorily carried out up to a certain point since the same specific light diffractive property as well as the same visual appearance as the authentic identification seal must be duplicated for forging the identification seal.

According to this structure, however, the counterfeit of the identification means is not entirely impossible because the use of a specific light diffractive property of the hologram as the identification means can be easily recognized and the identification seal cannot be made entirely unavailable to the counterfeiter. Therefore, a more effective identification structure has been strongly desired.

Based on such considerations, the Inventors have found that unauthorized fabrication could be discouraged even more effectively when the authenticity of the light reflecting region or the article itself is determined by taking into account the plane of polarization of the diffracted light in addition to the specific light reflective directivity (or specific light diffractive property).

BRIEF SUMMARY OF THE INVENTION

In view of such problems of the prior art and the recognition by the Inventors, a primary object of the present invention is to provide an identification structure for determining the authenticity of an article which is effective in discouraging unauthorized duplication.

A second object of the present invention is to provide an identification structure for determining the authenticity of an article which is relatively easy to fabricate but difficult to duplicate for a potential counterfeiter because of the difficulty in analyzing it.

A third object of the present invention is to provide an identification structure for determining the authenticity of an article which is effective in preventing unauthorized duplication, but relatively easy to identify by using a relatively simple means for identification.

These and other objects of the present invention can be accomplished by providing an identifying structure for determining the authenticity of an article, comprising: identification region provided on the article including an identification layer having a specific light reflective property, and a polarization plane rotating layer consisting of optically anisotropic material which rotates a plane of polarization of incident light to the identification region when the light is reflected by the identification region substantially by 90°; light emitting means for projecting incident light upon the light reflecting region, the incident light comprising linearly polarized light having a certain wave length and a plane of polarization extending in a first direction; light receiving means for receiving exit light therefrom; a filter provided in association with the light receiving element for allowing transmission of light having a plane of polarization extending in a second direction which is substantially perpendicular to said first direction; and identification means for detecting the authenticity of the article by evaluating the exit light received by the light receiving means.

According to the above described structure, because the light receiving means receives no diffracted light unless the optical identification means projects the linearly polarized light having a specific wave length and a specific polarization plane upon the identification region, the duplication of the diffractive or reflective property of the identification region alone is not sufficient for successful counterfeiting, and a strong discouraging effect can be produced. For a successful counterfeiting, it is necessary either to analyze the polarization property of the identification region or to analyze the structure of the light emitting means, and, in either case, such an analysis is so difficult that any attempt to counterfeit the identification region is effectively prevented.

The identification region may consist of a hologram, a diffraction grating, or a multiplicity of fine grooves extending in parallel with one another. Further, the polarization plane rotating layer may consist of the layer for forming the hologram or other means having a specific diffractive or reflective property, or, alternatively, an additional layer, such as a protective layer which is to be placed over the identification region.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
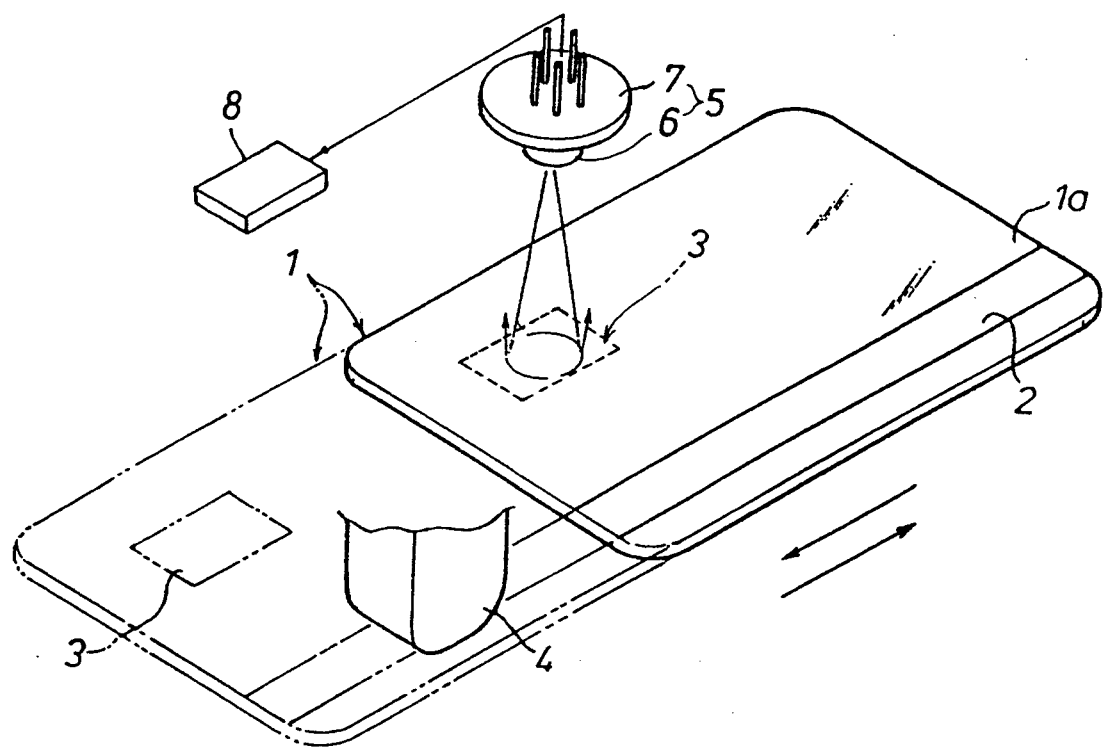
FIG. 1 is a perspective view of an essential part of the authenticity identifying structure according to the present invention as applied to a magnetic storage card.

FIG. 1 through 4 show a preferred embodiment of the authenticity identifying structure according to the present invention as applied to a magnetic memory card. As shown in FIG. 1, a magnetic stripe 2 provided on a major surface 1a of a rectangular card 1 extends in parallel with its travelling direction. An identification seal 3 serving as a light reflecting region formed by a hologram layer having a specific diffractive property, which will be described later, is provided on the major surface 1a of the card 1.

A magnetic head 4 is provided at such a position in a card reader/writer for the card 1 as to face the magnetic stripe 2 when the card 1 is conveyed through the card reader/writer by conveyer rollers or the like not shown in the drawings. A light emitting and receiving unit 5 serving as an optical identification means is also provided in the card reader/writer so as 10 to face the identification seal 3 at a certain distance when the card 1 is conveyed through the card reader/writer in a similar manner.

Figure 2:
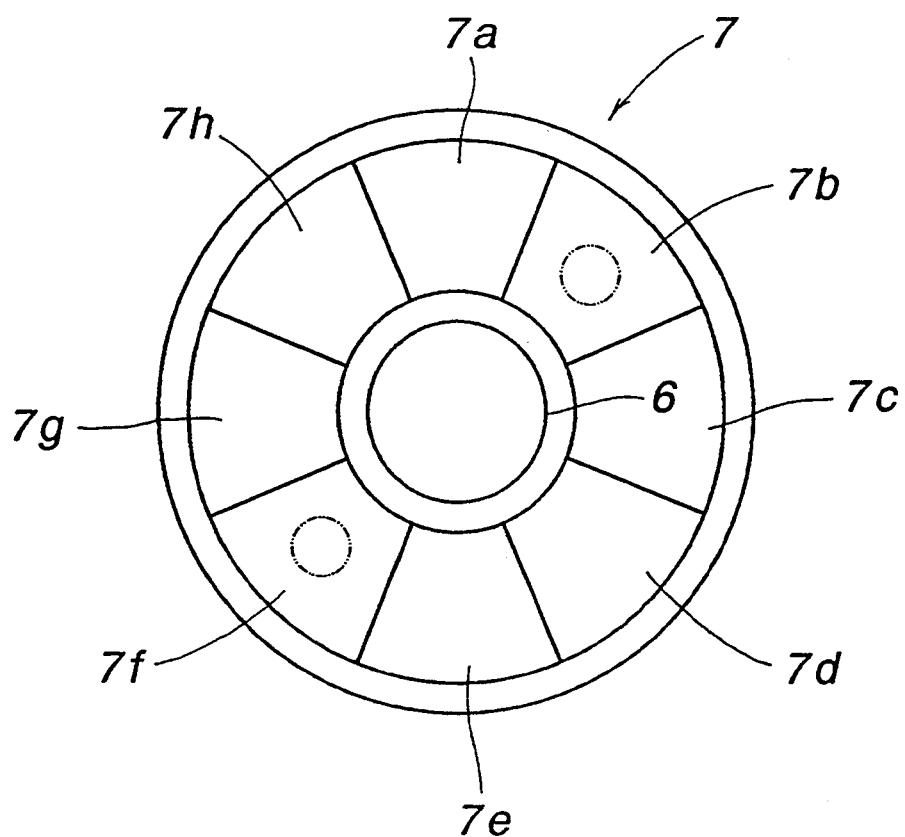
FIG. 2 is an enlarged plan view of the light receiving and emitting unit shown in FIG. 1.

The light emitting and receiving unit 5 comprises a light emitting element 6 for projecting a laser beam having a certain wave length and a certain linear polarization plane serving as a detecting light, and a light receiving element 7 surrounding the light emitting element 6 (FIG. 2). The incident light emitting from the light emitting element 7 may be polarized by using a suitable light emitting element or placing a polarization filter in the path of the emitted light. The light receiving element 7 consists of a multi-segment photodiode divided into a plurality of sectors 7a through 7h by radial lines to permit each individual sector to receive the light reflected and diffracted by the identification seal 3. The light receiving element 7 is connected to an identification unit 8 comprising a CPU, memory and an I/F unit to determine the authenticity of the card 1 in a known manner.

Figure 3:
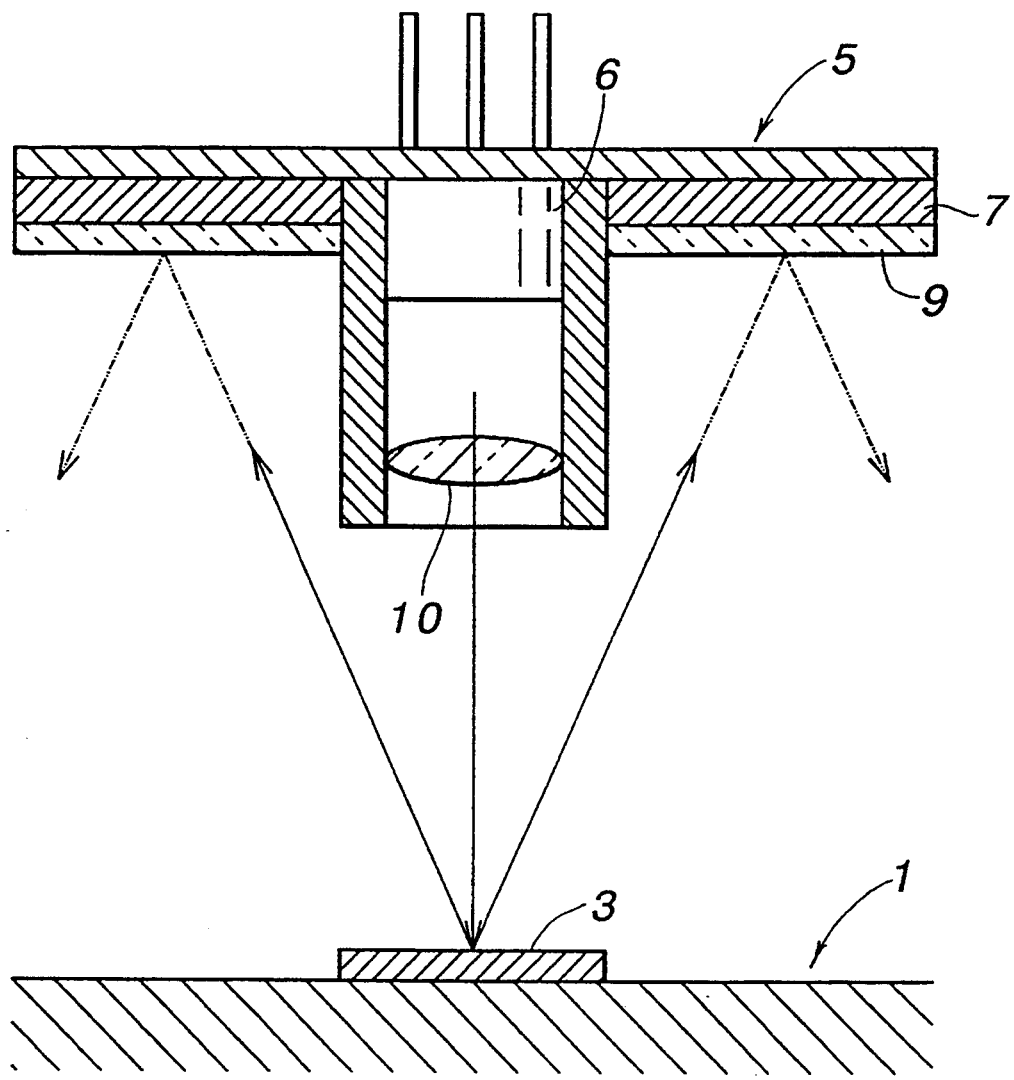
FIG. 3 is an enlarged side view of the light receiving and emitting unit showing in FIG. 1.

Further, as shown in FIG. 3, the surface of the light receiving element 7 is covered by a filter 9 allowing transmission of only the linearly polarized light having a polarization plane extending in a certain direction, more specifically, perpendicular to the plane of polarization of the incident light emitted from the light emitting element 6. An objective lens 10 is provided between the light emitting element 6 and the identification seal 3.

Figure 4:
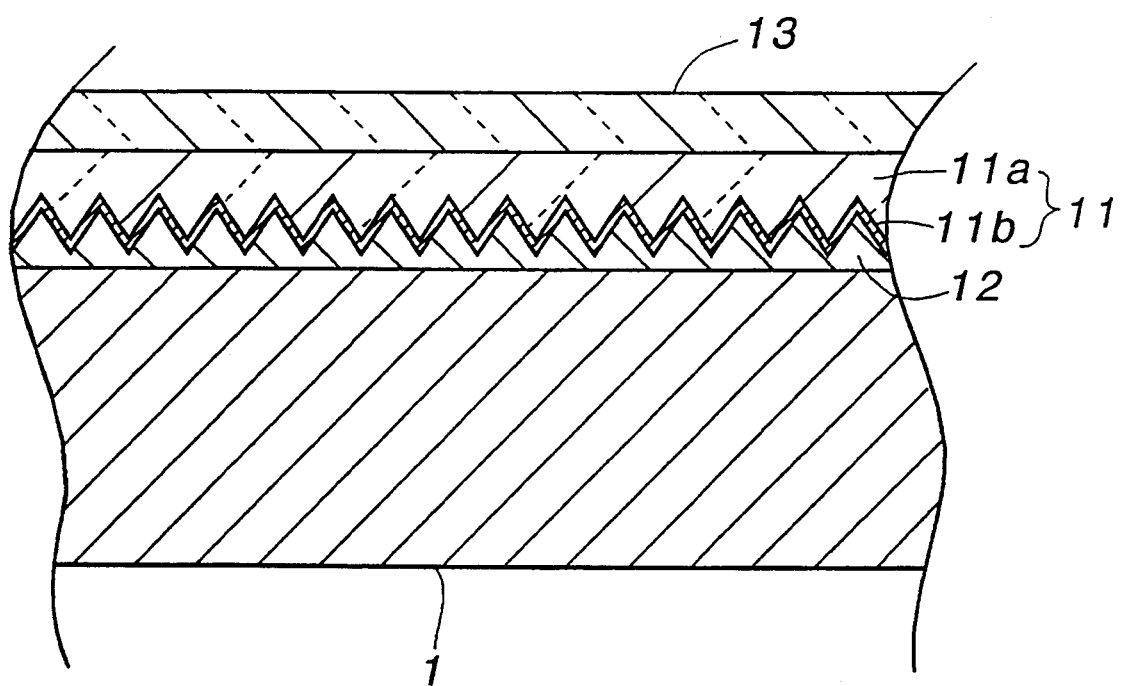
FIG. 4 is an enlarged sectional side view of the identification seal provided on the magnetic memory card.

Meanwhile, as shown in FIG. 4, the 5 identification seal 3 comprises a hologram layer 11 consisting of a hologram forming layer 11a and an underlying light reflecting layer 11b, an adhesive layer 12 for securing the hologram layer 11 to the major surface 1a of the card 1, and a protective layer 13 for covering the surface of the hologram layer 11. As a material for the hologram forming layer 11a, polycarbonate having a pronounced double refractive property is used. The thickness of the hologram forming layer 11a is so determined that the degree of double refraction amounts to one quarter of the wave length of the laser beam projected from the light emitting element 6.

Therefore, the incident laser light projected upon the identification seal 3 is reflected therefrom in the direction corresponding to the specific diffractive property of the hologram as a linearly polarized light beam rotated by 90° by being transmitted through the t hologram forming layer 11a twice. Normally, the hologram forming layer 11a is formed by covering the light reflecting layer 11b with a sheet of polycarbonate resin which is extended or stretched during a fabrication process.

Now, the operation of the embodiment is described in the following. As shown in FIG. 3, when the card 1 is conveyed to the position where the light emitting and receiving unit 5 faces the identification seal 3 at a certain distance, the incident detecting light having a certain wave length and a plane of polarization extending in a certain direction is projected from the light emitting element 6 upon the identification seal 3. The incident light is then double-refracted by the hologram forming layer 11a, and the diffracted linearly polarized light beam having its plane of polarization rotated by 90° with respect to the incident linearly polarized light is reflected by the light reflecting layer 11b in the direction corresponding to the specific diffractive property of the hologram. And the reflected light is directed upon one or a plurality of the sectors 7a through 7h of the light receiving element 7. When the reflected light is not a linearly polarized light beam having the plane of polarization rotated by 90° with respect to the incident linearly polarized light beam, the reflected light will be blocked by the filter 9 and will not substantially reach the light receiving element 7.

In this embodiment, the material having a pronounced double refractive property is used for the hologram forming layer 11a, but a similar effect can also be accomplished by using such material for the protective layer 13 instead of the hologram forming layer 11a. Alternatively, the material may consist of such materials as cellophane, polyvinyl alcohol (PVA), cellulose acetate, or any material having a double-refractive property and processed so as to have a degree of a double refractive property corresponding to one quarter of the wave length of the incident light.

As described above, according to the present invention, for the purpose of identifying the authenticity of an article, an incident detecting light beam having a certain wave length and a polarization plane extending in a certain direction is projected from a light emitting element, and the plane of polarization of this incident light is rotated by 90° as it impinges upon and reflected by an identification region having a specific reflective directivity owing to its diffractive property, and the reflected linearly polarized light is received by a light receiving element which is capable of recognizing the diffractive property via a polarization filter oriented so as to receive only the light having a plane of polarization perpendicular to that of the incident light. According to this structure, it is practically impossible to detect that this region is being used as such an identification region or to understand the structure for identification without analyzing the light emitting and receiving unit because the rotation of the polarization plane is determined merely by selecting the thickness and the optical property of the normally used material. Further, since the optical identification unit is not normally available to a potential counterfeiter, an unauthorized duplication is extremely difficult.

What we claim is:

1. An identifying structure for determining the authenticity of an article, comprising:
   identification region provided on said article including an identification layer having a specific light reflective property, and a polarization plane rotating layer consisting of optically anisotropic material which rotates a plane of polarization of incident light to said identification region when said light is reflected by said identification region substantially by 90°;
   light emitting means for projecting incident light upon said light reflecting region, said incident light comprising linearly polarized light having a certain wave length and a plane of polarization extending in a first direction;
   light receiving means for receiving exit light therefrom;

a filter provided in association with said light receiving means, said filter allowing transmission of light having a plane of polarization extending in a second direction which is substantially perpendicular to said first direction; and identification means for detecting the authenticity of said article by evaluating said exit light received by said light receiving means.

2. An identifying structure for determining the authenticity of an article according to claim 1, wherein the identification region consists of a light reflecting region comprising a multiplicity of parallel V- or U-grooves extending in parallel with each other, a hologram, or a diffraction grating having a specific diffractive property or a specific light reflective directivity.

3. An identifying structure for determining the authenticity of an article, comprising:

an identification region provided on said article including an identification layer having a specific light reflective property, and a polarization plane rotating layer consisting of optically anisotropic material which rotates a plane of polarization of incident light to said identification region when said light is reflected by said identification region substantially by 90°;

light emitting means for projecting incident light upon said light reflecting region, said incident light comprising linearly polarized light having a certain wave length and a plane of polarization extending in a first direction;

light receiving means for receiving exit light therefrom;

a filter provided in association with said light receiving means, said filter allowing transmission of light having a plane of polarization extending in a second direction which is substantially perpendicular to said first direction; and identification means for detecting the authenticity of said article by evaluating said exit light received by said light receiving means;

wherein the identification region consists of a light reflecting region comprising a multiplicity of parallel V- or U-grooves extending in parallel with each other, a hologram, or a diffraction grating having a specific diffractive property or a specific light reflective directivity; and wherein said identification layer also serves as said polarization plane rotating layer.

4. An identifying structure for determining the authenticity of an article according to claim 2, wherein said polarization plane rotating layer consists of a protective layer covering said identification layer.

5. An identifying structure for determining the authenticity of an article, comprising:

an identification region provided on said article including an identification layer having a specific light reflective property, and a polarization plane rotating layer consisting of optically anisotropic material which rotates a plane of polarization of incident light to said identification region when said light is reflected by said identification region substantially by 90°;

light emitting means for projecting incident light upon said light reflecting region, said incident light comprising linearly polarized light having a certain wave length and a plane of polarization extending in a first direction;

light receiving means for receiving exit light therefrom;

a filter provided in association with said light receiving means, said filter allowing transmission of light having a plane of polarization extending in a second direction which is substantially perpendicular to said first direction; and identification means for detecting the authenticity of said article by evaluating said exit light received by said light receiving means;

wherein the identification region consists of a light reflecting region comprising a multiplicity of parallel V- or U-grooves extending in parallel with each other, a hologram, or a diffraction grating having a specific diffractive property or a specific light reflective directivity; and wherein said polarization plane rotating layer consists of a combination of said identification layer and a protective layer covering said identification layer.

6. An identifying structure for determining the authenticity of an article, comprising:

an identification region provided on said article including an identification layer having a specific light reflective property, and a polarization plane rotating layer consisting of optically anisotropic material which rotates a plane of polarization of incident light to said identification region when said light is reflected by said identification region substantially by 90°;

light emitting means for projecting incident light upon said light reflecting region, said incident light comprising linearly polarized light having a certain wave length and a plane of polarization extending in a first direction;

light receiving means for receiving exit light therefrom;

a filter adjacent said light receiving means, said filter allowing transmission of light having a plane of polarization extending in a second direction which is substantially perpendicular to said first direction; and identification means for detecting the authenticity of said article by evaluating said exit light received by said light receiving means.

* * * * *